April 29, 1930.  F. A. HAYES  1,756,061
VARIABLE SPEED POWER TRANSMISSION MECHANISM
Filed June 9, 1924   2 Sheets-Sheet 1
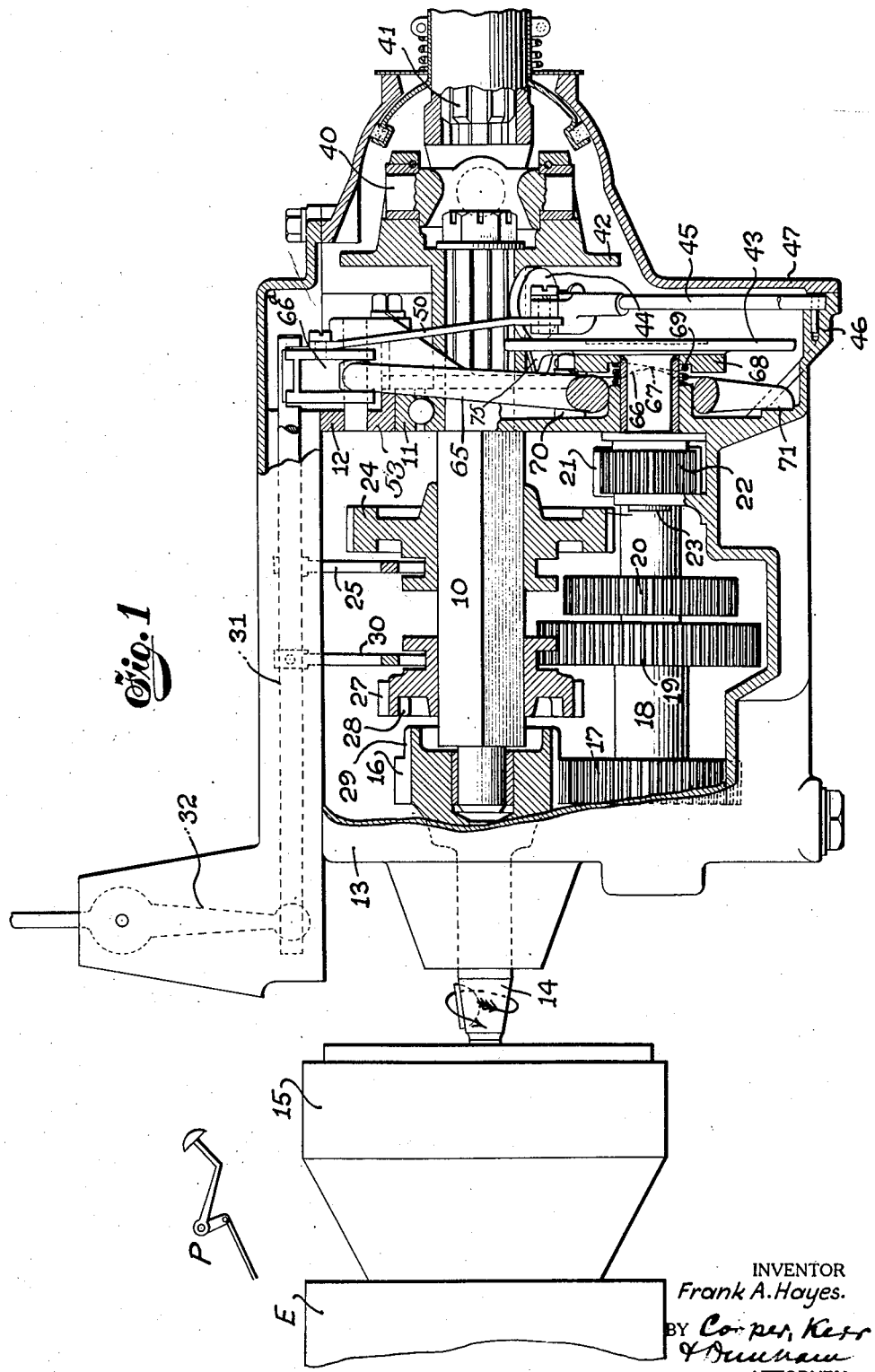
INVENTOR
Frank A. Hayes.
BY Cooper, Kerr
& Dunham
ATTORNEYS April 29, 1930.  F. A. HAYES  1,756,061
VARIABLE SPEED POWER TRANSMISSION MECHANISM
Filed June 9, 1924  2 Sheets-Sheet 2
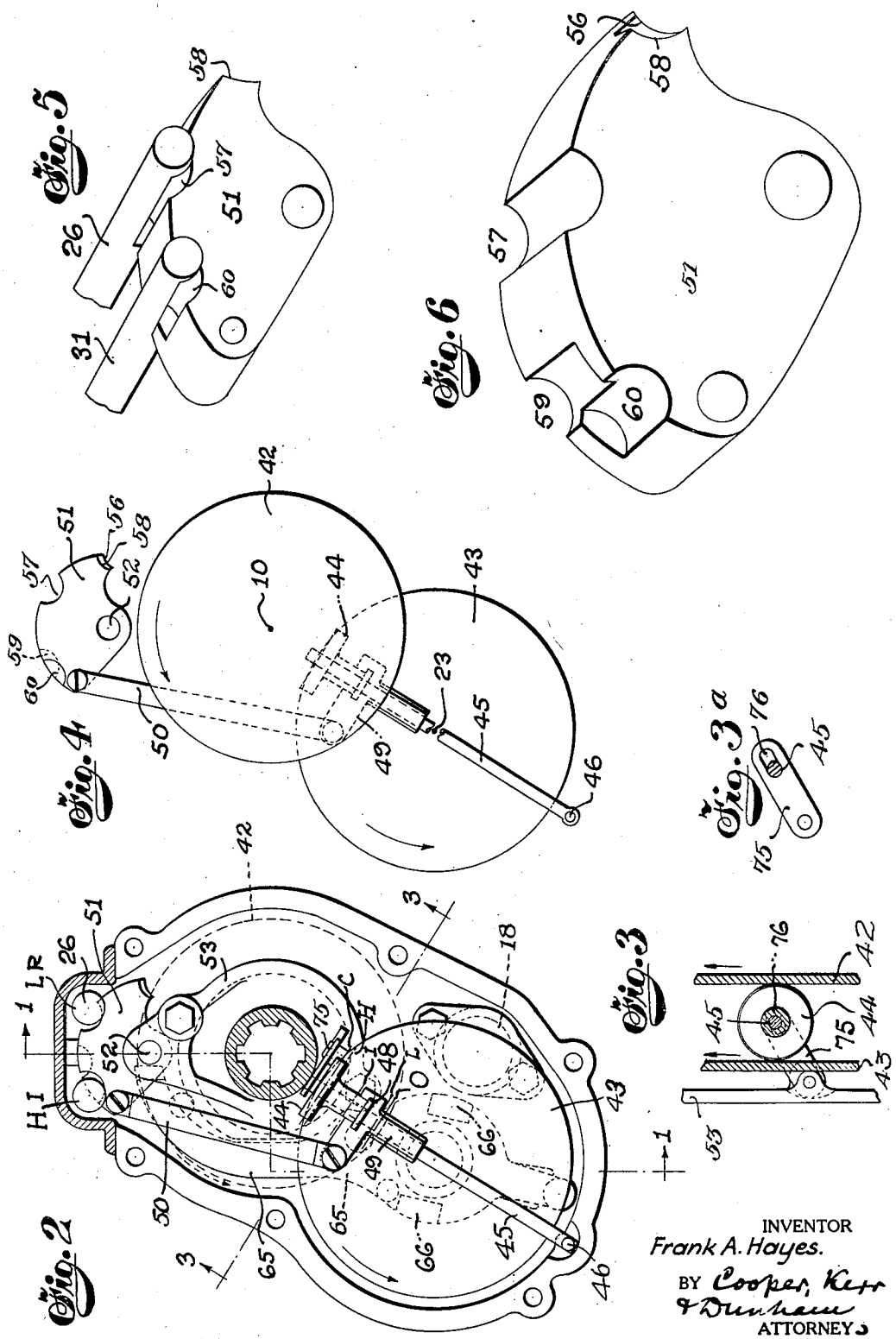
INVENTOR
Frank A. Hayes.
BY Cooper, Kerr
& Dunham
ATTORNEYS Patented Apr. 29, 1930

1,756,061

UNITED STATES PATENT OFFICE

FRANK A. HAYES, OF KEYPORT, NEW JERSEY

VARIABLE-SPEED POWER-TRANSMISSION MECHANISM

Application filed June 9, 1924. Serial No. 718,742.

This invention relates to variable-speed power-transmission mechanisms in which the various "speed" changes are produced by shifting gears of different diameters out of and into mesh. In such transmissions one or both of the gears which are to be meshed are usually in motion at different pitch-line velocities, with the result that the shift is often accompanied by objectionable grinding noise and by sudden shocks which are liable to cause serious injury to the gears. On the other hand if the gears are running at the same or very nearly the same pitch-line velocity they can be slid into engagement easily and noislessly, without shock. It is accordingly the chief object of my present invention to provide a mechanism, preferably of the sliding gear type, in which the shiftable gear or gears are positively locked until the increasing velocity of one or the decreasing velocity of the other, or both these factors, have brought the gear tooth velocities to the desired ratio, which ratio is, as stated above, preferably unity. When this point is reached the lock is automatically released and the gears are therefore allowed to slide smoothly and quietly into mesh. Another object is to provide for automobile use a mechanism which has the novel characteristics mentioned but which does not otherwise depart materially from the conventional type of transmission. To these and other ends the invention resides in the novel features and combinations hereinafter described.

In its preferred form the invention includes a device or mechanism which automatically passes through a series of positions as the speed ratios of the gears vary. At these positions a pair of gears is unlocked and can be slid into mesh, the gears in each instance being those which are running with the tooth velocity appropriate for meshing. Preferably, also, the gears are driven independently of each other to bring them to the desired velocity, but it is to be understood that the invention is not limited in this respect but can be embodied in structures in which one gear drives or retards the other by a suitable connection before they are shifted into mesh. It is believed that the invention will find its most important application in the automotive field and I have therefore illustrated herein an embodiment in the form of an automobile transmission of the selective sliding gear type, but it may be used for other purposes. Any suitable means may be employed to effect the actual shifting of the gears but for the sake of simplicity I show herein a simple lever of the conventional type, for manual actuation.

Referring now to the accompanying drawings, in which the preferred form of the invention is illustrated, Fig. 1 is a vertical longitudinal section about on line 1—1 of Fig. 2.

Fig. 2 is a rear view with the rear cover removed and the main shaft in cross section.

Fig. 3 is a detail section on line 3—3 of Fig. 2.

Fig. 3ª is a detail view of a part shown in Fig. 3, for preventing damage to the mechanism under certain conditions.

Fig. 4 is a diagrammatic rear view of the selector or synchronizing mechanism.

Fig. 5 is a detail perspective view of the locking sector and shifter rods.

Fig. 6 is a detail perspective view of the locking sector, showing the "unlocking" notches in its edge, which permit sliding of the shifter rods at the instants when the selected gears are running with the tooth velocities appropriate for meshing.

The splined or squared driven shaft 10, Fig. 1, is mounted in a bearing 11 in the transverse rear wall 12 of the gear-case or housing 13 and at its front end the shaft is journaled in the driving shaft 14 which is itself driven by the engine through a suitable friction clutch indicated diagrammatically at E and 15, respectively. On the rear of the driving shaft is a gear 16, in constant mesh with a gear 17 on the jackshaft or countershaft 18, which also carries the fixed (non-sliding) "intermediate" gear 19, the non-sliding "low" gear 20, and the reverse gear 21, the latter being in constant mesh with the reverse idler gear 22 on the reverse idler shaft 23 at the side of the counter-shaft. The sliding "low" and "reverse" gear 24, on the driven or main shaft 10, may be shifted rearwardly into mesh with the reverse idler 22 or forwardly into mesh with the fixed low gear 20, by means of a fork 25, Fig. 1, fixed on the sliding shifter rod 26, Fig. 2; and the sliding "intermediate" and "high" gear 27 can be shifted rearwardly into mesh with the fixed intermediate gear 19, or forwardly to bring the clutch member 28, on the front face of the gear 27, into engagement with the cooperating clutch member 29 on the rear face of gear 16 (thus giving "high" speed or "direct drive") by means of a fork 30 on shifter rod 31. Either rod may be picked up by the manual shift-lever 32 in the usual manner.

At its rear end, outside of the main housing or gear case 13, the main shaft 10 is connected by a universal joint 40 to the propeller shaft 41 by which the driving torque is transmitted to the rear wheels of the car. Fixed to or integral with the driving element of the universal joint, and arranged to face forwardly, is a friction disk 42, preferably of hardened steel, and fixed on the rear end of the reverse idler shaft 23 is a similar disk 43, overlapping the first, as indicated. Disk 42, being connected to the universal joint, rotates at a speed strictly proportional to the speed of the car, and disk 43, being connected to the reverse idler shaft, rotates at a speed strictly proportional to the speed of the engine when the clutch is engaged. It will here be noted that the idler shaft is shiftable axially in its bearings, but that the idler gear itself is preferably non-sliding. Between the two disks, and in frictional engagement therewith, is a selector or synchronizing wheel 44, freely rotatable and also slidable on the axle or rod 45 pivoted at 46 at the bottom of the housing 13 just in front of the rear cover 47 and in the plane of the axes of disks 42, 43. The hub of the selector wheel is provided with a flange 48 (see also Fig. 2) fitted to rotate in a slot in sleeve 49 which is also slidable on the rod or carrier 45 and is connected by a link 50 to the sector 51 pivoted and slidable on a pin 52 in the rear housing wall 12 and cover 53 provided for the main shaft bearing 11. The function of this sector is to lock the shifter rods, as will be fully explained hereinafter, but at this point it will be seen that as the selector wheel 44 moves on the pivoted carrier rod or axle 45 the sleeve 49 will also be shifted and will in turn impart oscillatory reciprocation to the locking member or sector 51.

Further understanding of the invention will be facilitated by referring now to Fig. 4, which is a diagrammatic rear elevation of the selecting or synchronizing mechanism. It is assumed (1) that the transmission is in neutral, the engine running, the car in forward motion, and the clutch engaged. Under such circumstances the disks are rotating in the counterclockwise direction, as indicated by the arrows, disk 42 at a speed corresponding to the speed of the car and disk 43 at a speed depending upon the speed of the engine. Disk 42 tends to shift the selector wheel 44 toward the right, and disk 43 tends to shift it toward the left. Which of these tendencies will prevail depends upon the surface velocities of the disks at the points where they engage the wheel, which velocities in turn depend upon the angular speeds of the disks and the distances of the points of contact from their axes 10, 23. Thus, assuming (2) that the wheel is midway between the axes with its own axis in the same plane, and that the two disks have the same angular speed, the surface velocities where they engage the wheel will be equal and the tendency of one disk is offset by the tendency of the other, with the result that the wheel is rotated but has no movement of translation. Assuming now (3) that the engine is accelerated, thereby speeding up disk 43: The surface velocity of the latter at its point of contact with the wheel is then greater than the corresponding velocity of disk 42, and consequently the wheel is shifted leftwardly, and also downwardly on the pivoted shaft or carrier 45, thereby drawing link 50 downwardly and rocking the sector 51 counterclockwise. If the engine speed does not exceed a certain value, however, the wheel will eventually reach a position at which by reason of the increased distance from axis 10 and the decreased distance from axis 23, the surface velocities of the disks are again equal at their points of engagement with the wheel, whereupon the translational motion of the wheel will cease if it is then in the plane of the disk axes. On the other hand, assuming (4) that the effective surface velocity of disk 42 is the greater, the wheel will move rightwardly and as soon as it passes to the right of the plane of the axes of the disks it will move upwardly, thereby rocking sector 51 clockwise. In short the translational motion of the wheel depends on two velocities, of which one is a direct function of the car speed and the other a direct function of the countershaft speed; which latter is in turn a function of the engine speed alone, so long as the clutch is engaged and the transmission is in neutral.

It will now be seen that under (1) above, the position of the sector 51 depends upon the car-speed and engine-speed conjointly, its extreme clockwise position being taken when the ratio of engine-speed to car-speed falls below a predetermined value, depending upon the design of the parts, and its extreme counterclockwise position being taken when the ratio rises above a predetermined value. Throughout this range the position of the sector at any instant depends upon the ratio of the two speeds; and advantage is taken of this characteristic to lock and unlock the shifter rods, so that the sliding gears can be shifted into mesh with the non-sliding gears only when the tooth or pitch-line velocities of the gears which are to be meshed have a predetermined ratio, preferably unity. This feature of the invention will now be described.

The locking sector 51 is mounted with its curved edge in the path of shifter rods 26, 31, which (see Fig. 5) are provided with notches or recesses adapted to embrace the edge of the sector when the rods are in neutral position, as in Fig. 5. The sector can then be rocked by the selector wheel 44 as previously described. The sector itself has notches or recesses (best shown in Fig. 6) in its curved edge, and hence neither rod can be shifted in either direction (far enough to mesh a pair of gears) unless one of the sector-notches is in its path. Thus in Fig. 5, neither rod can be shifted to mesh a pair of gears. If, however, the sector is shifted far enough counterclockwise (in Figs. 2 and 6) to bring notches 56 and 57 into register with the shift rods either of the latter can be shifted in either direction, since these notches are open clear across the edge of the sector. This is the position of the sector when the selector wheel 44 is in what may be termed its "off" position, that is, its extreme downward position (indicated by the line O, Fig. 2) which it takes when the car is standing still and the disk 43 is in motion. Hence when the car is at rest any one of the sliding gears on the main shaft 10 can be shifted in either direction. Other positions of the selector wheel are taken by it at different ratios of engine speed to car speed. Thus when the ratio is such that the tooth-velocities of low-speed sliding gear 24 (Fig. 1) and low-speed non-sliding gear 20 are appropriate for meshing, the wheel is in the position indicated by the line L, the exact location of which depends upon the design of the parts, as will be readily understood. When the wheel is at L the locking sector 51 has a corresponding position, at which the notch 58, appropriately located on its periphery, is in register with shift rod 26. The latter can then be shifted forwardly to mesh the low-speed gears, but not rearwardly, since the front edge of the sector blocks the rod at that point, notch 58 extending only part way through. When the ratio of engine speed to car speed is such that the tooth-velocities of the intermediate-speed gears 19 and 27 are suitable for meshing, the corresponding position of the selector wheel is indicated by the line I. Notch 59 is then presented to rod 31, and the latter can be shifted rearwardly to mesh the intermediate-speed gears, but not forwardly since notch 59 extends only part way through the sector. Similarly, when the ratio of engine-speed to car-speed is such that the tooth velocities of clutch members 28 and 29, Fig. 1, are suitable for engagement, the selector wheel is in the position indicated by the line H, and notch 60 is in registry with rod 31, thereby permitting the latter to be shifted forwardly but not rearwardly.

Means may be provided to insure adequate friction between the selector wheel 44 and the disks 42, 43. Mechanism suitable for the purpose is shown in Figs. 1 and 2, in which 65 is a floating thrust lever encircling the reverse idler shaft 23 and having cheeks 66 on its side portions to cooperate with helical surfaces 67 on the thrust washer 68, which is itself urged rearwardly by a spring 69 so as to press the disk 43 against the selector wheel, as will be readily understood. The upper end of the thrust lever is engaged by a recess 66ª in the side of the sector 51, which, it will be remembered, is capable of limited axial movement on its pivot 52. Hence, if the operator attempts to shift gears when the shift rod which he is trying to actuate is locked by the sector, the pressure of the rod on the sector will press it forwardly or rearwardly, as the case may be. If forwardly, the thrust lever rocks on its upper fulcrum 70. If rearwardly, the lever rocks on its lower fulcrum 71. In each case the cheeks 66 urge the thrust washer 68 rearwardly and with it the disk 43, thus producing whatever additional friction is needed for the proper operation of the selector mechanism. The rotation of disk 43 being always counterclockwise (as viewed from the rear) the friction between the disk and the thrust washer 68 puts a torque or twist on the latter in the same direction, which tends to wedge the helical surfaces 67 against the cheeks 66, thereby urging the lever forwardly against its fulcrums 70, 71, and insuring instant response to the thrust of the shift lever. The mechanism is thus self-adjusting and self-aligning.

When either disk 42 or 43 is rotating and the other stationary, the friction of the stationary disk on the selector wheel 44 may prevent the latter from moving, in which case the rotating disk may wear a flat spot on the wheel, which, although not interfering with the operation of the mechanism would make it noisy, and accordingly means are provided to prevent such wear. Suitable devices for the purpose may comprise a link 75, Figs. 1, 2 and 3, pivoted at one end on the bearing cover-plate 53 and having in its other end a slot 76 embracing the upper end of the selector wheel shaft or carrier 45 and serving to limit the swing of the shaft on opposite sides of the plane of the disk axes. The arrows in Fig. 3 show the directions of rotation of the disks. If disk 42 is stationary, disk 43 will roll the wheel leftwardly (in Fig. 2, upwardly in Fig. 3) until shaft 45 strikes the outer end of the slot 76, whereupon further movement of the wheel is prevented. But the pressure of the shaft against the end of the slot tends to rock the link counterclockwise (Fig. 3) on its pivot and therefore decrease the pressure of the wheel on disk 42. The wheel then rotates with disk 43 and the wear on the former is thus distributed around its periphery. If disk 43 is stationary and the other rotating, the wheel is moved rightwardly (as viewed in Fig. 2) thereby tending to rock the link clockwise (Fig. 3), which decreases the pressure on disk 43, with the result that the wheel rotates with disk 42. A similarly inclined slot in a stationary part can be employed for the same purpose. It will also be seen that if the car should stop suddenly with the gears in neutral and the engine running the action of the slot 76 in causing the selector wheel to rotate with disk 43 will insure the wheel moving down to the off position. The same result follows when the engine is started after it has been stalled with any pair of gears in mesh.

When the gears of any pair are rotating in mesh the angular speed ratio of the disks is constant at a certain value (which is determined by the ratios of the various gears involved), hence the selector wheel would automatically assume the position corresponding to such ratio and accordingly the locking sector would stand with the corresponding unlocking notch or recess in register with the shifter rod which controls the sliding gear. In the construction illustrated the shifter rod is in engagement with the corresponding notch when two gears are in mesh, and hence the wheel and sector are actually locked in the proper position. The driver can therefore shift into neutral at any time. When in neutral, any change in the speed ratio of the disks causes the selector wheel to move, and with it the sector, thereby locking the shifter rods (and hence all the gears), in neutral until the wheel reaches a position at which a notch is presented to one rod or the other. The unlocked rod can then be shifted to mesh the unlocked gears; which gears at that instant are running with the predetermined ratio of their pitch-line or tooth velocities.

The operation of the mechanism will now be readily understood. Assume that the car is at rest, with the engine running and the clutch disengaged. Under these conditions the selector wheel takes the "off" position (line O, Fig. 2) and presents notches 56 and 57 on the locking sector or latch to the rods 31 and 26 respectively. Rod 26 can then be advanced to mesh the low gears 24 and 20 (Fig. 1) or retracted to mesh gear 24 with the reverse idler gear 22; or rod 31 can be retracted to mesh intermediate gears 27 and 19, or advanced to engage the jaw-clutch 28—29. Having engaged the low gears and started the car, and desiring to shift into second or intermediate speed the operator closes the engine throttle as by raising his foot from the accelerator pedal P, Fig. 1, which may be taken to represent the throttle, disengages the clutch, puts the low gears in neutral, presses the control lever 32 into the second speed slot, and engages the clutch. Gear 27 is now driven by the car; but the engine drives gear 19 at decreasing speed, since the throttle is closed. Under these conditions the selector wheel moves up, rocking the latch or locking sector clockwise. When the more rapid deceleration of gear 19 and disk 43 brings the tooth velocity of the former down to the tooth velocity of gear 27 (driven by the car) the selector wheel is then at the "intermediate" position, indicated by line I, Fig. 2, and notch 59 in the latch is in registry with rod 31, whereupon the pressure which the operator has been exerting on the shift lever retracts the rod and meshes gears 27 and 19, then running with the same tooth velocity. Opening the throttle, the operator speeds up the car. Desiring to shift into "high," he closes the throttle, releases the clutch, unmeshes gears 27 and 19, re-engages the clutch and presses the control lever into the high speed notch. The selector wheel now rises; and as the tooth velocity of the jaw-clutch member 29 (which is rotating at decreasing speed since the engine throttle is closed) reaches the tooth velocity of member 28 the selector wheel reaches the high position, indicated by the line H, Fig. 2, in which position the notch 60 in the latch is presented to rod 31, whereupon the clutch member 28 slides into engagement with member 29.

In the speed changes described above the friction clutch 15 is engaged during the shift; but since the gears are brought into synchronism with each other by decreasing the speed of the non-sliding gears, it will be seen that the clutch may be disengaged. In fact the deceleration of the non-sliding gears will usually be faster if they are disconnected from the engine, and hence "shifting up" can, in general, be effected more quickly with the clutch disengaged. In "shifting down," however, from a higher speed to a lower, the clutch must be engaged.

Assuming now that the driver desires to shift down, say from high to second speed: Closing the throttle and releasing the clutch he shifts into neutral, then presses the control lever into the second speed notch, engages the clutch and opens the throttle. The engine now speeds up, and drives disk 43 at higher speed than disk 42, thus causing the selector wheel to move down, rocking the latch counterclockwise. At the instant the tooth velocity of gear 19 has increased to that of gear 27 the selector wheel reaches the second or intermediate speed position I, Fig. 2. Notch 59 on the latch is then in registry with rod 31, thus permitting the gears to be meshed by retraction of the rod. Or suppose that the driver desires to shift from high into low. In this case the procedure is the same as in shifting from high into second, except that the lever is pressed into the low slot. The shift from second to low is made in the same manner. In every case the shift can be made only when the gears are running at the appropriate tooth velocities; and since the velocity of the non-sliding gear depends upon the speed of the engine it will be seen that at the instant of meshing the gears the engine is always running at the speed it should have when the car is traveling at the given velocity.

To shift into reverse the selector wheel must be in the "off" position, since it is only when the wheel is in that position that the notch 56 on the latch is presented to rod 26. At all other times rearward movement of the rod is prevented by the latch.

One of the most important advantages of the mechanism illustrated is the ease and safety with which a selected pair of gears can be meshed after coasting down grade with all the gears in neutral and the engine idling. In this case the clutch is engaged and the control lever is pressed into the slot for the desired speed, after which the operator opens the engine throttle. The operation of the mechanism is then the same as in "shifting down", described above; the selected non-sliding gear and disk 43 are driven at increasing speed until the tooth-velocity of the former reaches the tooth-velocity of the selected sliding gear, whereupon the latter slides smoothly and silently into mesh.

It will be seen that with the mechanism described the operator cannot shift a pair of gears into mesh unless they are running at the predetermined ratio of pitch-line or tooth velocities. If in attempting to make a shift he fails to accomplish it, he can simply repeat the effort until he succeeds, which is what he would do with the conventional transmission mechainsm. For example, suppose that when desiring to shift down, say from high to second speed, he neglects to press the control lever into the second speed slot as he speeds up the engine. In such case the locking latch or sector will rock past the second speed position and on toward the low position, with the result that pressure then applied to the lever in the second speed slot will find the second speed sliding gear locked. He then closes the throttle, whereupon the resulting deceleration of the engine and the second speed gear causes the sector to swing back to the second speed position. The gears then slide into mesh. In short, by maintaining the pressure on the lever in the selected speed slot and alternately accelerating and decelerating the engine (the clutch being engaged) even the most inexperienced or unskillful operator will eventually mesh the selected gears without noise or shock.

As is well known, the common practice in "shifting up" with the conventional type of transmission is to unmesh the gears and hold them in neutral momentarily, until (as judged by experience) the sliding gear has decelerated enough to permit a quiet shift. Upon reflection it will be seen that the mechanism described herein provides this "dwell" auotmatically, keeping the sliding gear locked until it is synchronized with the other.

It is to be understood that the invention is not limited to the mechanism herein specifically described but can be embodied in other forms without departure from its spirit.

I claim:—

1. In a variable-speed power-transmission mechanism, in combination, a pair of gears shiftable into mesh while both are rotating, automatic means, including a pivoted locking member, for preventing shifting of the gears into mesh except when they have a predetermined pitch-line velocity ratio, automatic mechanism for gradually shifting the locking member to unlocking position while the said velocity ratio is approaching the predetermined value, and means then operable at will for shifting the gears into mesh.

2. In a variable-speed power-transmission mechanism, in combination, a pair of gears shiftable into mesh while both are rotating, manual means for shifting the gears, automatic means permitting meshing of the gears only when they have a predetermined pitch-line velocity ratio, said automatic means including a pivoted locking member, and automatic mechanism for gradually shifting the locking member to unlocking position while the said velocity ratio is approaching the predetermined value.

3. In a variable-speed power-transmission mechanism, in combination, a pair of gears shiftable into mesh while rotating; a movable member for shifting the gears into mesh, a pivoted latch arranged to lock the movable member and having an unlocking position, and automatic mechanism for gradually shifting the locking member to unlocking position while the said velocity ratio is approaching the predetermined value.

4. In a variable-speed power-transmission mechanism, in combination, a pair of gears shiftable into mesh while rotating, a reciprocatory rod for shifting the gears, a latch pivoted to swing across the path of the rod and having a notch to permit movement of the rod when the latch is in a predetermined position, and automatic means operating in harmony with the gears to rock the latch to said predetermined position when the tooth velocities of the gears have a predetermined ratio.

5. In a variable-speed power-transmission mechanism, in combination, a pair of gears shiftable into mesh while rotating, a movable member for shifting the gears, a latch pivoted to swing across the path of the movable member to lock the same and having a position at which the member is unlocked, a pair of overlapping disks connected with the respective gears and rotating therewith, a carrier shaft pivoted to swing between the disks, a selector wheel mounted to rotate and reciprocate axially on the carrier shaft, and means connecting the selector wheel with the pivoted latch to actuate the same.

6. In a variable-speed power-transmission mechanism, in combination, a pair of gears shiftable into mesh while rotating, locking and unlocking means to prevent and permit meshing of the gears, a pair of overlapping disks connected with the respective gears and rotating therewith, a carrier shaft pivoted to swing between the disks across the plane of their axes, a selector wheel rotatable and axially movable on the carrier shaft, and means connecting the selector wheel with the said locking and unlocking means to actuate the same.

7. In a variable-speed power-transmission mechanism, in combination, an engine-driven shaft, a shaft adapted to be driven independently, a plurality of gears non-rotatably mounted on the shafts and capable of relative axial shifting thereon in pairs to mesh with each other, gear-shifting means, a single locking and unlocking device cooperating with said gear-shifting means to prevent and permit meshing of the gears, automatic means connected with the locking and unlocking means for actuating the same to permit meshing of the gears when the tooth velocities thereof have a predetermined ratio, and means operable at will for varying the speed of the engine-driven shaft to bring the velocity of the gear thereon to the predetermined ratio.

8. In a variable-speed power-transmission system for automobiles, in combination, a pair of gears shiftable into mesh while rotating, locking and unlocking means to prevent and permit meshing of the gears, and automatic engine-driven gear-synchronizing means operating at will to produce a predetermined ratio of the tooth velocities of the gears, and automatic means to actuate said locking and unlocking means and thereby permit meshing of the gears when said predetermined ratio is attained.

9. In a variable speed power-transmission system, in combination, a pair of gears, means for driving one of the gears with variable speed to vary its tooth velocity, a pair of friction disks connected with the respective gears to rotate in harmony therewith, a movable selector wheel in frictional engagement with both disks whereby the movement of the wheel is determined by the disks conjointly, means for shifting said gears into mesh, a pivoted latch associated with the shifting means to lock and unlock the same, and a connection between the movable selector wheel and said latch to actuate the latter.

10. In a variable speed power transmission system, in combination, a plurality of pairs of gears, engine-driven means for driving one gear of each pair, means for varying the speed of the engine to vary the tooth velocity of the gear driven thereby, means operable to select a pair of gears for meshing and shift one of the selected pair into mesh with the other, and automatic means dependent for operation upon the tooth velocities of the gears conjointly and having a locking member cooperating with said shifting means to lock the plurality of pairs of gears when the tooth velocities of the selected pair are unequal and unlock the selected pair when the tooth velocities of the latter are equal, while the engine-driven means remain in engagement with that gear of the said selected pair which is actuated thereby.

11. In a variable speed power-transmission system, in combination, a pair of gears shiftable into mesh by relative axial movement, means operable at will to produce such movement, including a longitudinally sliding shifter rod, a latch pivoted to swing across the path of the shifter rod to lock and unlock the same, and means for actuating the latch, dependent for operation upon the tooth velocities of the gears conjointly.

12. In a variable speed power-transmission system, in combination, a pair of gears shiftable into mesh while both are rotating, a longitudinally movable shifter rod for shifting the gears, a pivoted latch mounted to swing across the path of the rod to lock the same and having a notch to permit movement of the rod, and devices operating in harmony with the respective gears to rock said latch and bring the notch thereof to a position permitting movement of the rod, when the gears have a predetermined tooth-velocity ratio.

13. In a variable speed power-transmission system, in combination, a pair of gears adapted to be shifted into mesh while both are rotating, a friction disk associated with one of said gears to rotate in harmony therewith, a second friction disk associated with the other gear to rotate in harmony therewith, a selector wheel in frictional engagement with said disk for actuation by both conjointly, a shaft on which the selector wheel is axially movable, said shaft being pivoted to swing transversely of the axes of said disks, and means actuated by the selector wheel to lock and unlock the gears when their tooth-velocities are unequal and equal, respectively.

14. In a variable speed power-transmission system, in combination, a pair of gears shiftable into mesh while both are rotating, a pair of overlapping friction disks rotatable on parallel axes and connected with the respective gears to rotate in harmony therewith, a shaft pivoted to swing transversely between the disks across the plane of their axes, a selector wheel movable axially on said shaft and engaging both disks for actuation thereby, and gear locking and unlocking means actuated by the selector wheel.

15. In a variable speed power-transmission system, in combination, a pair of relatively shiftable gears, a longitudinally movable shifter rod associated with the gears to shift the same and having a lateral recess, a swinging sector-shaped latch having its curved edge embraced by the recess in the rod and having a notch in its curved edge to permit movement of the rod when said recess and notch are in register, and means operating in harmony with the gears to swing the sector-shaped latch and bring its notch into registry with said recess whenever the gears have a predetermined tooth-velocity ratio.

16. In a variable speed power-transmission system, in combination, a plurality of gears shiftable into mesh in pairs, a plurality of shifter rods associated with the gears to shift the same, a latch movable across the path of said rods and having notches, at least one for each pair of gears, to permit actuation of the rods for shifting the gears, said notches being arranged to permit actuation of only one rod in only one direction at a time, and automatic means operating in harmony with the gears to bring the appropriate notch to the appropriate shifter rod when the gears to be meshed have a predetermined tooth-velocity ratio.

17. In a variable speed power-transmission system, in combination, a pair of gears shiftable into mesh, a shifter rod associated with the gears to mesh the same, a locking member movable across the path of the rod to lock the same against gear-shifting movement and having a recess to unlock the rod to permit such movement, and automatic means to actuate the locking member and operating to bring the recess in the locking member into unlocking position when the tooth-velocities of the gears have a predetermined ratio.

18. In a variable speed power-transmission system, in combination, a pair of gears shiftable into mesh, engine-driven means for rotating one of the gears at a tooth velocity variable at will, a shifter rod associated with the gears to mesh the same, a locking member movable across the path of the rod to lock the same against gear shifting movement and having a recess to unlock the rod and permit such movement, an automatic means operating in harmony with the engine driven gear to shift the locking member and bring said recess to unlocking position when the tooth-velocity of the gears has a predetermined ratio.

19. In a variable speed power-transmission system, in combination, a plurality of gears shiftable into mesh in pairs, engine-driven means for synchronizing one gear of each pair with the other of the pair, and automatic locking means, including a single locking member, to prevent meshing of any pair of gears so long as their tooth-velocity ratio differs from a predetermined ratio.

In testimony whereof I hereto affix my signature.

FRANK A. HAYES.